United States Patent
Lee et al.

(10) Patent No.: US 12,067,955 B2
(45) Date of Patent: Aug. 20, 2024

(54) PERSONALIZED COLOR TEMPERATURE ADAPTATION FOR CONSUMER DISPLAY DEVICES

(71) Applicant: Samsung Electronics Co., Ltd., Suwon-si (KR)

(72) Inventors: Ho Sub Lee, Irvine, CA (US); Young Min Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/702,696

(22) Filed: Mar. 23, 2022

(65) Prior Publication Data
US 2023/0306926 A1     Sep. 28, 2023

(51) Int. Cl.
G09G 5/02     (2006.01)
G09G 5/10     (2006.01)

(52) U.S. Cl.
CPC ............... G09G 5/02 (2013.01); G09G 5/10 (2013.01); *G09G 2320/0626* (2013.01); *G09G 2320/0666* (2013.01); *G09G 2360/144* (2013.01)

(58) Field of Classification Search
CPC .... G09G 5/02; G09G 5/10; G09G 2320/0626; G09G 2320/0666; G09G 2360/144
See application file for complete search history.

(56) References Cited

U.S. PATENT DOCUMENTS

| | | | |
|---|---|---|---|
| 9,478,157 B2 | 10/2016 | Wu et al. | |
| 10,921,596 B2 | 2/2021 | Nocon et al. | |
| 2009/0021587 A1* | 1/2009 | Snyderman | H04N 17/02 348/207.11 |
| 2009/0055139 A1* | 2/2009 | Agarwal | G06Q 30/0254 707/999.005 |

(Continued)

FOREIGN PATENT DOCUMENTS

| | | |
|---|---|---|
| CN | 211957690 U | 5/2020 |
| CN | 111667798 A | 6/2020 |

(Continued)

OTHER PUBLICATIONS

Nam, J. et al., "Visual content adaptation according to user perception characteristics", IEEE Transactions on Multimedia, Jun. 2005, pp. 435-445, vol. 7, No. 3, IEEE, United States.

(Continued)

*Primary Examiner* — Antonio Xavier
(74) *Attorney, Agent, or Firm* — Sherman IP LLP; Kenneth L. Sherman; Steven Laut

(57) ABSTRACT

One embodiment provides a method comprising collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The method further comprises transmitting to a remote server the ALS data and the UPC, and receiving (Continued)

from the remote server one or more models constructed based in part on some of the ALS data and some of the UPC. The method further comprises automatically adjusting one or more color temperature settings of the display device based on the one or more models.

18 Claims, 10 Drawing Sheets

(56) References Cited

U.S. PATENT DOCUMENTS

| | | |
|---|---|---|
| 2010/0271390 A1 | 10/2010 | Tran et al. |
| 2013/0076974 A1* | 3/2013 | Atkins .................... H04N 5/57 |
| | | 375/240.03 |
| 2014/0333683 A1 | 11/2014 | Qi et al. |
| 2015/0032328 A1* | 1/2015 | Healey .................. B60Q 1/544 |
| | | 701/36 |
| 2015/0070337 A1 | 3/2015 | Bell et al. |
| 2015/0346987 A1 | 12/2015 | Ren et al. |
| 2019/0073601 A1* | 3/2019 | Alkan .................... G06N 20/00 |
| 2019/0232108 A1* | 8/2019 | Kovach .................. G16H 40/63 |
| 2019/0237001 A1* | 8/2019 | Lin ....................... G09G 3/2044 |
| 2019/0258953 A1* | 8/2019 | Lang ....................... G06N 3/08 |
| 2019/0362688 A1* | 11/2019 | Wang ....................... G09G 5/10 |
| 2020/0380938 A1* | 12/2020 | Greenebaum ............ G09G 5/06 |
| 2021/0142711 A1* | 5/2021 | Maeng .................. G09G 3/2003 |
| 2021/0287114 A1* | 9/2021 | Zhou ....................... G06N 5/04 |
| 2021/0374132 A1* | 12/2021 | Yang .................. G06F 16/2457 |
| 2022/0129700 A1* | 4/2022 | Lin ..................... G06F 21/6245 |
| 2022/0225871 A1* | 7/2022 | Peana ..................... G16H 50/30 |
| 2022/0246305 A1* | 8/2022 | Gupta .................... G16H 50/30 |
| 2022/0254120 A1* | 8/2022 | Berliner ................. G06F 3/033 |
| 2023/0041339 A1* | 2/2023 | Ni ..................... G06Q 30/0202 |
| 2023/0162047 A1* | 5/2023 | Mortazavi ................ G06N 3/08 |
| | | 706/15 |

FOREIGN PATENT DOCUMENTS

| | | |
|---|---|---|
| CN | 112735352 A | 12/2020 |
| CN | 113064687 A | 3/2021 |
| JP | 2010-34698 A | 2/2010 |
| JP | 2011-071680 A | 4/2011 |

OTHER PUBLICATIONS

International Search Report and Written Opinion dated May 17, 2023 for International Application PCT/KR2023/002296, from Korean Intellectual Property Office, pp. 1-7, Republic of Korea.

* cited by examiner

PERSONALIZED COLOR TEMPERATURE ADAPTATION FOR CONSUMER DISPLAY DEVICES

TECHNICAL FIELD

One or more embodiments generally relate to color temperature adaptation, in particular, a method and system of providing personalized color temperature adaptation for a consumer display device.

BACKGROUND

Correlated color temperature (CCT) is a measure of light frequencies emitted, and chromaticity observed, from a black body radiator (i.e., black surface) as the black body radiator is heated. CCT is measured in degrees Kelvin (K), which indicates the temperature of the black body radiator. Light emitted from the black body radiator changes color as the black body radiator is heated. As the heat increases, the color of the light emitted changes from warm colors such as red (the temperature of the black body radiator ranges from 1000K to 2700K) and yellow (the temperature of the black body radiator ranges from 2700K to 4500K) to cool colors such as white (the temperature of the black body radiator ranges from 4500K to 7000K) and blue (the temperature of the black body radiator ranges from 7000K-10000K).

CCT is used in ambient lighting (e.g., LED light bulbs), image capture (e.g., video content), and consumer display devices (e.g., TV).

SUMMARY

One embodiment provides a method comprising collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The method further comprises transmitting to a remote server the ALS data and the UPC, and receiving from the remote server one or more models constructed based in part on some of the ALS data and some of the UPC. The method further comprises automatically adjusting one or more color temperature settings of the display device based on the one or more models.

Another embodiment provides a system comprising at least one processor and a non-transitory processor-readable memory device storing instructions that when executed by the at least one processor causes the at least one processor to perform operations. The operations include collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The operations further include transmitting to a remote server the ALS data and the UPC, and receiving from the remote server one or more models constructed based in part on some of the ALS data and some of the UPC. The operations further include automatically adjusting one or more color temperature settings of the display device based on the one or more models.

One embodiment provides a non-transitory processor-readable medium that includes a program that when executed by a processor performs a method comprising collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The method further comprises transmitting to a remote server the ALS data and the UPC, and receiving from the remote server one or more models constructed based in part on some of the ALS data and some of the UPC. The method further comprises automatically adjusting one or more color temperature settings of the display device based on the one or more models.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
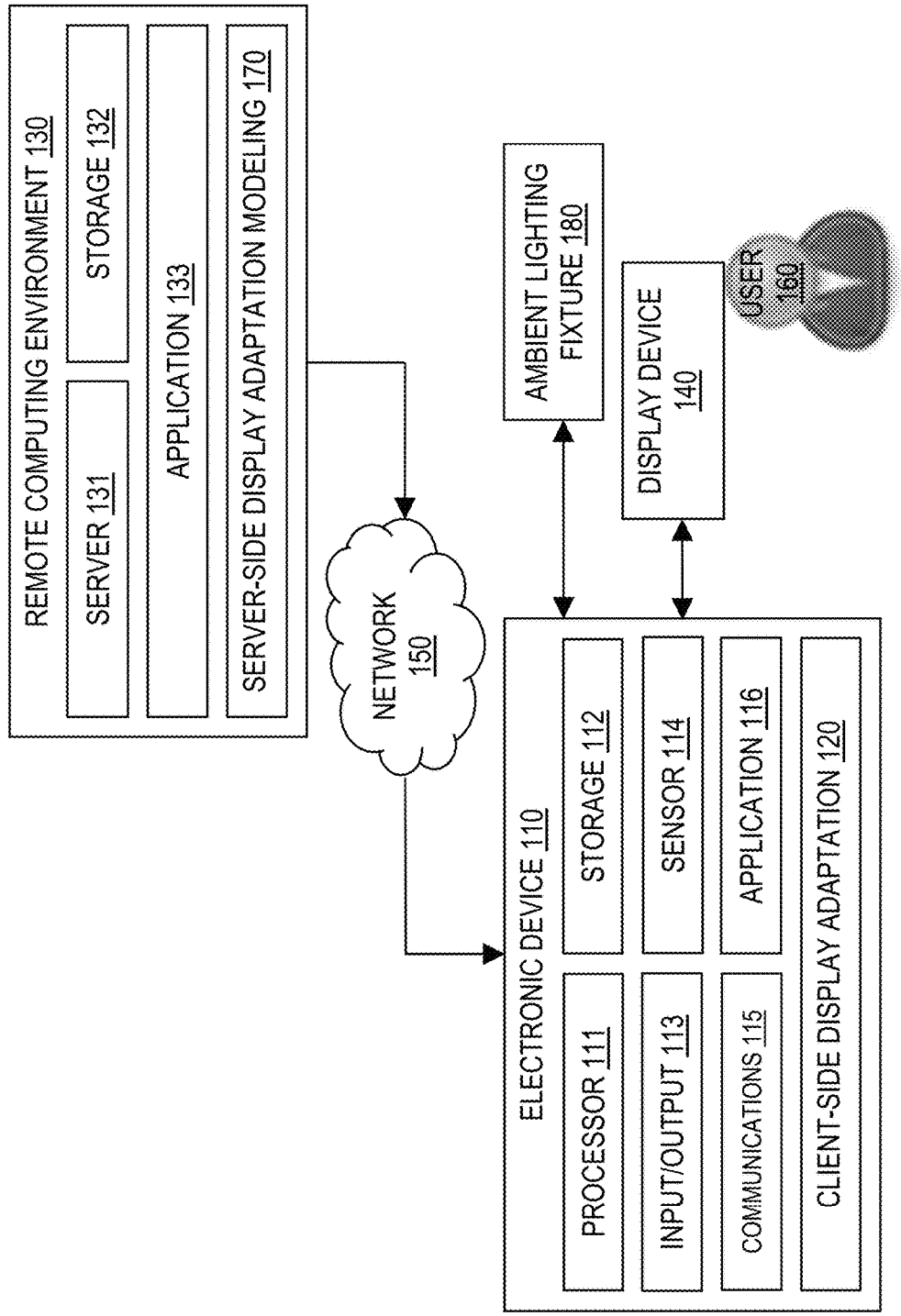
FIG. 1 is an example computing architecture for personalized display adaptation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to color temperature adaptation, in particular, a method and system of providing personalized color temperature adaptation for a consumer display device. One embodiment provides a method comprising collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The method further comprises transmitting to a remote server the ALS data and the UPC, and receiving from the remote server one or more models constructed based in part on some of the ALS data and some of the UPC. The method further comprises automatically adjusting one or more color temperature settings of the display device based on the one or more models.

Another embodiment provides a system comprising at least one processor and a non-transitory processor-readable memory device storing instructions that when executed by the at least one processor causes the at least one processor to perform operations. The operations include collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The operations further include transmitting to a remote server the ALS data and the UPC, and receiving from the remote server one or more models constructed based in part on some of the ALS data and some of the UPC. The operations further include automatically adjusting one or more color temperature settings of the display device based on the one or more models.

One embodiment provides a non-transitory processor-readable medium that includes a program that when executed by a processor performs a method comprising collecting ambient light sensing (ALS) data indicative of one or more ambient lighting conditions of a user within proximity of a display device, and collecting user preferences and characteristics (UPC) of the user. The UPC include a user-preferred display correlated color temperature (CCT). The user-preferred display CCT represents a CCT the user prefers for the display device. The method further comprises transmitting to a remote server the ALS data and the UPC, and receiving from the remote server one or more models constructed based in part on some of the ALS data and some of the UPC. The method further comprises automatically adjusting one or more color temperature settings of the display device based on the one or more models.

Image quality on a display device, as perceived by a user, may be impacted by the CCT of ambient lighting in the user's viewing environment (i.e., light emitted from black body radiator(s) surrounding the display device). Typically, a user prefers image quality on a display device when the CCT of the display device is adjusted based on the CCT of ambient lighting in the user's viewing environment. For example, if the CCT of ambient lighting in the user's viewing environment decreases, the CCT of the display device should also be lowered in accordance with the user's preference.

Some conventional display devices provide users with an option of changing the CCT of the display devices. For example, the CCT of a display device may be changed to one of multiple pre-defined preset settings, such as standard (normal temperature range), warm (low temperature range), or cool (high temperature range). As another example, the CCT of a display device may be changed by a continuous adjustment from warm (low temperature range) to cool (high temperature range). As another example, the CCT of a display device may be changed by adjusting the CCT of each color (red, green, and blue); such an adjustment is preferably performed by experts, such as professional display calibrators.

Due to limits in time, motivation, and knowledge, users, especially novice users, may not be able to adjust the CCT of their display devices to obtain the best/optimal viewing experience from their display devices. For example, most novice users do not actively change the CCT of their display devices as they have a limited understanding of CCT. Experiments involving recruiting human subjects and instructing them to self-report (e.g., via an online survey) their ambient lighting conditions as well as their preferences with regards to the CCT of their display devices may be conducted, but such experiments are costly, time-consuming, and prone to human errors.

Users, or groups of users grouped based on demographics (e.g., race, age, gender, etc.), have different user preferences with respect to image quality on display devices, including user-preferred CCTs of the display devices. As such, because of different user preferences, it is difficult to model user-preferred CCTs of display devices. Conventional technologies provide a one-size-fits-all solution for adjusting the CCT of a display device that is based on the CCT of ambient lighting in a user's viewing environment and does not factor into account the user's individual preferences. It is also difficult to model user-preferred CCTs of display devices because each user's viewing environment is unique and diverse (e.g., number and types of LED bulbs around a display device, whether the display device is installed indoors or outdoors, weather, covering of one or more windows in the viewing environment, orientation of a screen of the display device with respect to the windows, etc.).

One or more embodiments provide a method and system of automated and personalized CCT adaptation of display devices based on ambient lighting conditions in viewing environments of different users and user preferences and/or user situations of the different users. In one embodiment, relationships between the ambient lighting conditions and the user preferences and/or the user situations are computationally modeled to implement the personalized CCT adaptation. In one embodiment, for each of the different users, information indicative of the user's preferred CCT of a display device as well as environmental information, demographic information, and contextual information are collected. One or more computational models are built based on all the information collected. The models are used to infer a user's preferred CCT of a display device based on certain preconditions. The information collected and the models are used to adjust a CCT of a display device to provide a user with the best/optimal viewing experience from the display device. Unlike conventional technologies, users can experience the best possible perceived image quality on their display devices without much user effort and expense (e.g., does not require much time, motivation, and knowledge, and does not require the hiring of an expert).

FIG. 1 is an example computing architecture 100 for personalized display adaptation, in one or more embodiments. The computing architecture 100 comprises an electronic device 110 including resources, such as one or more processor units 111 and one or more storage units 112. One or more applications may execute/operate on the electronic device 110 utilizing the resources of the electronic device 110.

For expository purposes, the term "display CCT" generally denotes a CCT of a display device 140, and the term "environment CCT" generally denotes a CCT of a viewing environment of one or more users 160 within proximity of the display device 140. The environment CCT is affected by one or more ambient lighting fixtures 180 within the viewing environment.

In one embodiment, the one or more applications on the electronic device 110 include a client-side display adaptation system 120. In one embodiment, the system 120 provides display color temperature adaptation (DCTA) which is a process involving automated and personalized adaptation of a CCT of a display device 140 integrated in or coupled to the electronic device 110. The system 120 provides DCTA based on one or more ambient lighting conditions in a viewing environment of one or more users 160 within proximity of the display device 140 and UPC of the users 160. The viewing environment includes one or more ambient lighting fixtures 180 providing ambient lighting, such as one or more light bulbs (e.g., smart LED bulbs), etc.

In one embodiment, to provide DCTA, the system 120 is configured to: (1) collect ALS data indicative of one or more ambient lighting conditions in the viewing environment, wherein the ALS data includes an environment CCT of the viewing environment, (2) for each user 160, collect corresponding UPC including a user-preferred display CCT for the display device 140, (3) transmit the data collected to a remote computing environment 130, (4) receive one or more multiple linear regression (MLR) models from the remote computing environment 130, wherein each MLR model is built/constructed based in part on the data collected, (5) adjust the environment CCT, and (6) adjust or optimize the display CCT of the display device 140 based on the MLR models.

For expository purposes, the term "display brightness" generally denotes a level of brightness (i.e., illuminance or light level) a display device 140, and the term "environment illuminance" generally denotes an illuminance or light level of a viewing environment of one or more users 160 within proximity of the display device 140. The environment illuminance is affected by one or more ambient lighting fixtures 180 within the viewing environment.

In one embodiment, the system 120 provides display brightness adaptation (DBA) which is a process involving automated and personalized adaptation of the brightness of the display device 140. The system 120 provides DBA based on one or more ambient lighting conditions in a viewing environment of one or more users 160 within proximity of the display device 140 and UPC of the users 160.

In one embodiment, to provide DBA, the system 120 is configured to: (1) collect ALS data indicative of one or more ambient lighting conditions in the viewing environment, wherein the ALS data includes an environment illuminance of the viewing environment, (2) for each user 160, collect corresponding UPC including a user-preferred display brightness for the display device 140, (3) transmit the data collected to a remote computing environment 130, (4) receive one or more MLR models from the remote computing environment 130, wherein each MLR model is built/constructed based in part on the data collected, (5) adjust the environment brightness, and (6) adjust or optimize the display brightness of the display device 140 based on the MLR models.

Examples of an electronic device 110 that a display device 140 is integrated into or coupled to include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, the electronic device 110 comprises one or more sensor units 114 integrated in or coupled to the electronic device 110, such as, but not limited to, a RGB color sensor, an IR sensor, an illuminance sensor, a color temperature sensor, etc. In one embodiment, the electronic device 110 comprises one or more additional sensor units 114 such as, but not limited to, a camera, a microphone, a GPS, a motion sensor, etc. In one embodiment, the client-side display adaptation system 120 collects ALS data via the sensor units 114.

In one embodiment, at least one of the sensor units 114 is integrated in (i.e., pre-installed) or coupled (attached) to the display device 140. For example, in one embodiment, the display device 140 (e.g., a smart TV) includes an array of sensor units 114 for capturing ALS data.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 113 to configure UPC, configure one or more parameters (e.g., pre-defined thresholds), provide user input, etc.

In one embodiment, the one or more applications on the electronic device 110 may further include one or more software mobile applications 116 loaded onto or downloaded to the electronic device 110, such as a camera application, a social media application, a video streaming application, etc. A software mobile application 116 on the electronic device 110 may exchange data with the client-side display adaptation system 120.

In one embodiment, the electronic device 110 comprises a communications unit 115 configured to exchange data with the display device 140 (e.g., receiving one or more display characteristics of the display device 140, such as current display CCT, current display brightness, etc.). The communications unit 115 is further configured to exchange data with a remote computing environment, such as the remote computing environment 130 (e.g., receiving input video from the remote computing environment 130, receiving MLR models from the remote computing environment 130), over a communications network/connection 150 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 150. The communications unit 115 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes resources, such as one or more servers 131 and one or more storage units 132. One or more applications 133 that provide higher-level services may execute/operate on the remote computing environment 130 utilizing the resources of the remote computing environment 130.

In one embodiment, the one or more applications on the remote computing environment 130 include a server-side display adaptation modeling system 170. In one embodiment, the system 170 performs DCTA modeling that involves constructing one or more MLR models for use in DCTA. In one embodiment, to perform DCTA modeling, the system 170 is configured to: (1) receive, from one or more electronic devices 110, data collected by the electronic devices 110, (2) build/construct one or more MLR models, wherein each MLR model is built/constructed based in part on the data collected, and (3) provide the MLR models to the electronic devices 110.

In one embodiment, the system 170 performs DBA modeling that involves constructing one or more MLR models for use in DBA. In one embodiment, to perform DBA modeling, the system 170 is configured to: (1) receive, from one or more electronic devices 110, data collected by the electronic devices 110, (2) build/construct one or more MLR models, wherein each MLR model is built/constructed based in part on the data collected, and (3) provide the MLR models to the electronic devices 110.

In one embodiment, the remote computing environment 130 provides an online platform for hosting one or more online services (e.g., a software update service for the electronic device 110 and/or the display device 140 such as a smart TV software update service, a recommendation service such as a device setting recommendation service, a video streaming service, etc.) and/or distributing one or more software mobile applications 116. For example, the client-side display adaptation system 120 may be loaded onto or downloaded to the electronic device 110 from the remote computing environment 130 that maintains and distributes updates (e.g., software updates issued by a manufacturer of the electronic device 110 and/or the display device 140) for the system 120.

In one embodiment, the remote computing environment 130 may comprise a cloud computing environment providing shared pools of configurable computing system resources and higher-level services (e.g., data analytics). In another embodiment, the remote computing environment 130 may comprise an edge computing environment providing more safe, scalable, and reliable data processing and computation for display color temperature adaptation modeling and/or display brightness adaptation modeling.

In one embodiment, the client-side display adaptation system 120 is integrated into, or implemented as part of, a video on demand (VOD) system.

Figure 2:
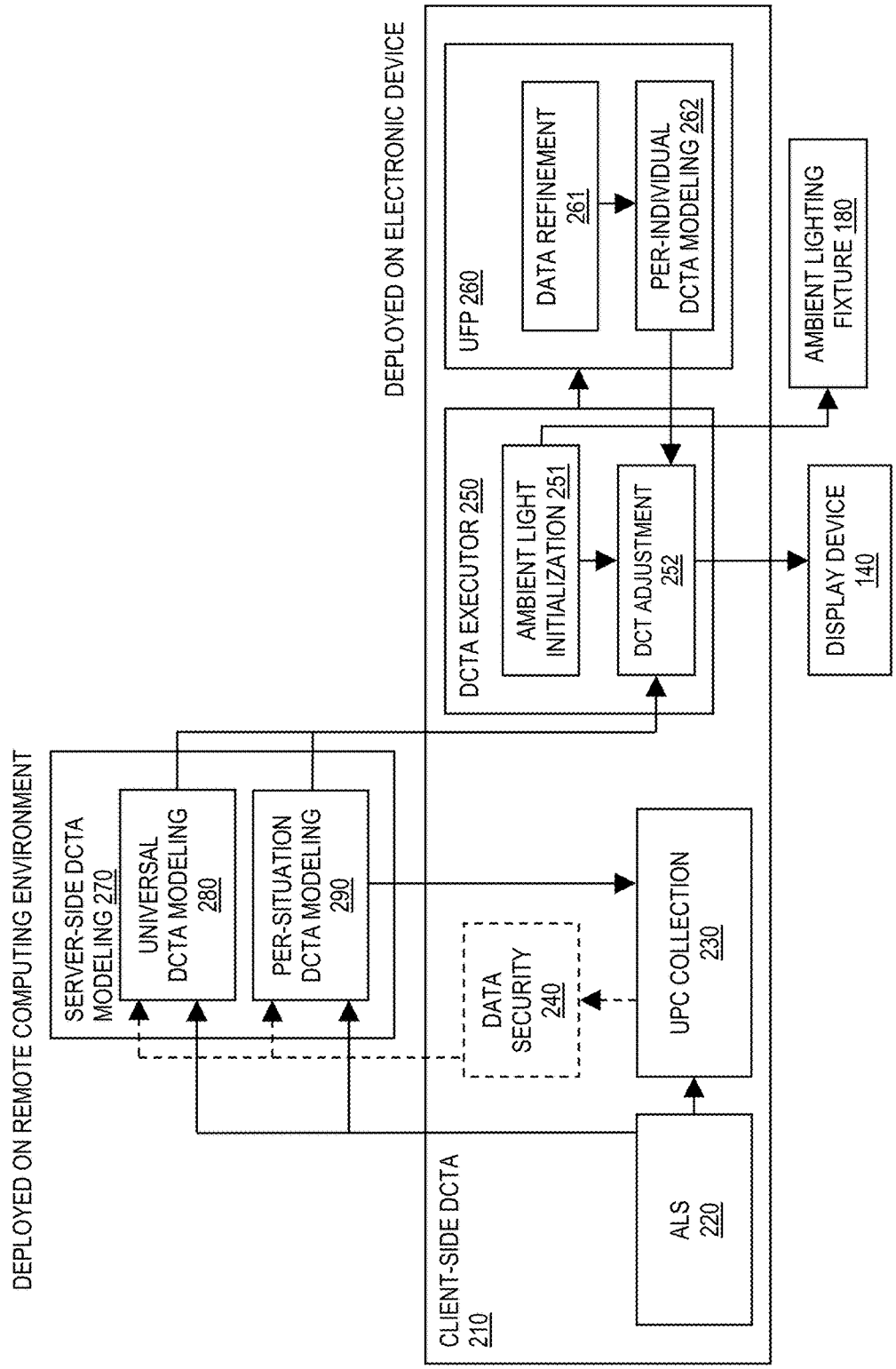
FIG. 2 illustrates an example system for implementing display color temperature adaptation (DCTA) and DCTA modeling, in one or more embodiments.

FIG. 2 illustrates an example system 200 for implementing DCTA and DCTA modeling, in one or more embodiments. The system 200 comprises: (1) a client-side DCTA system 210 configured to perform DCTA, and (2) a server-side DCTA modeling system 270 configured to perform DCTA modeling.

In one embodiment, the client-side DCTA system 210 is deployed at an electronic device 110 that a display device 140 is integrated into or coupled to. For example, the client-side DCTA system 210 is integrated into, or implemented as part of, the client-side display adaptation system 120 in FIG. 1.

In one embodiment, the server-side DCTA modeling system 270 is deployed at a remote computing environment 130. For example, the server-side DCTA modeling system 270 is integrated into, or implemented as part of, the server-side display adaptation modeling system 170 in FIG. 1.

In one embodiment, the client-side DCTA system 210 comprises an ALS unit 220 configured to collect, utilizing one or more sensor units 114, current ALS data indicative of one or more current ambient lighting conditions in a viewing environment of one or more users 160 within proximity of a display device 140. In one embodiment, the current ALS data includes one or more measurements such as, but not limited to, measurements of red color, green color, and blue color (i.e., RGB color), a measurement of white color, a measurement of illuminance in units of lux, a measurement of environment CCT in degrees Kelvin, and a measurement of infrared radiation (IR) or infrared light.

In one embodiment, the ALS unit 220 is configured to collect ALS data without user interaction (i.e., unobtrusively collect ALS data). In one embodiment, the ALS unit 220 is configured to collect ALS data periodically (e.g., in accordance with a pre-defined time interval). For example, ALS data may be collected every thirty minutes.

In one embodiment, the ALS unit 220 is configured to collect ALS data in response to a pre-defined event. For example, ALS data may be collected in response to a user 160 interacting with an I/O unit 113 (e.g., clicking/pressing a button on a remote control for the display device 140, launching a video streaming app, etc.).

In one embodiment, the ALS unit 220 is further configured to collect metadata corresponding to current ALS data for use in distinguishing the current ALS data from other ALS data (e.g., collected at a different time, collected in a different viewing environment, etc.). In one embodiment, metadata corresponding to ALS data is indicative of context, the electronic device 110 and/or the display device 140, and/or each user 160. Examples of metadata include, but are not limited to, a timestamp, a unique identification (ID) of the electronic device 110 and/or the display device 140, an IP address, etc.

In one embodiment, the ALS unit 220 transmits a set of ALS data to an internal module of the client-side DCTA system 210 after the set is collected. In another embodiment, the ALS unit 220 aggregates one or more sets of ALS data after the one or more sets are collected, and transmits the resulting aggregated set to an internal module of the client-side DCTA system 210.

In one embodiment, the client-side DCTA system 210 comprises a UPC collection unit 230 configured to collect, for each user 160, corresponding UPC. In one embodiment, UPC corresponding to a user 160 include, but are not limited to, a user-preferred display CCT indicative of a CCT preferred by the user 160 for the display device 140. For example, in one embodiment, the UPC collection unit 230 collects UPC corresponding to a user 160 by sequentially presenting an image using at least two different color temperature settings to the user 160 on the display device 140. As another example, in one embodiment, the UPC collection unit 230 collects UPC corresponding to a user 160 by simultaneously presenting images formatted with at least two different color temperature settings to the user 160 on the display device 140, and prompting the user 160 to select which of the images presented the user 160 most prefers (i.e., most preferred image).

In one embodiment, images the UPC collection unit 230 presents on the display device 140 may be sampled from one or more pieces of content each user 160 had viewed on the display device 140. In one embodiment, images the UPC collection unit 230 presents on the display device 140 may be grouped into one or more categories (e.g., news, sports, scenery, cartoon). In one embodiment, for each user 160, the UPC collection unit 230 maintains one or more corresponding per-user image databases (e.g., on one or more storage units 112 of the electronic device 110). Each per-user image database corresponding to a user 160 maintains one or more images sampled from one or more pieces of content the user 160 watched on the display device 140, wherein the one or more images are grouped into a particular category (e.g., news, sports, scenery, cartoon). In another embodiment, the UPC collection unit 230 maintains one or more general image databases (e.g., on one or more storage units 112 of the electronic device 110), wherein each general image database comprises one or more images grouped into a particular category.

In one embodiment, the UPC collection unit 230 is configured to: (1) receive a message from an external module (e.g., the server-side DCTA modeling system 270) that the external module is ready to receive ALS data, (2) determine whether a UPC collection condition has been met, and (3) in response to determining the UPC collection condition has been met, collect UPC. The UPC collection condition may be either a periodic condition representing a pre-defined time interval or an event-based condition representing a pre-defined event. If the UPC collection condition is the periodic condition, the UPC collection unit 230 collects UPC periodically in accordance with the pre-defined time interval. For example, UPC may be collected every Wednesday evening. If the UPC collection condition is the event-based condition, the UPC collection unit 230 collects UPC when the pre-defined event occurs (e.g., a pre-defined user interaction). For example, UPC corresponding to a user 160 may be collected in response to the user 160 interacting with an I/O unit 113 (e.g., clicking/pressing a button on a remote control, launching a video streaming app, etc.).

In one embodiment, UPC corresponding to a user 160 include metadata such as, but not limited to, demographic metadata (e.g., race, age, gender, etc.), contextual metadata (e.g., genre and title of pieces of content the user 160 is watching), and/or behavioral metadata. In one embodiment, the UPC collection unit 230 collects demographic metadata (e.g., gender) corresponding to a user 160 via self-report. In another embodiment, the UPC collection unit 230 collects contextual metadata (e.g., content title) corresponding to a user 160 utilizing automatic content recognition (ACR) techniques. As described in detail later herein, metadata collected by the UPC collection unit 230 is used to build one or more per-situation DCTA models.

In one embodiment, the UPC collection unit 230 receives ALS data from the ALS unit 220, collects UPC, and transmits the ALS data together with the UPC. In another embodiment, the UPC collection unit 230 receives ALS data from the ALS unit 220, collects one or more instances of UPC, aggregates the one or more instances, and transmits the ALS data together with the resulting aggregated instance of UPC.

In one embodiment, the UPC collection unit 230 transmits, over the network 150, to an external module (e.g., the server-side DCTA modeling system 270), ALS data and UPC.

In another embodiment, the UPC collection unit 230 transmits, to an internal module of the client-side DCTA system 210, ALS data together with UPC. Specifically, to reduce or minimize potential data privacy risks, the client-side DCTA system 210 comprises an optional data security unit 240 that the UPC collection unit 230 transmits ALS data and UPC to. The data security unit 240 is configured to: (1) receive, from the UPC collection unit 230, ALS data and UPC, (2) anonymize/redact/obfuscate the ALS data and the UPC to protect sensitive personal data (e.g., race, age, gender) included therein, and (3) transmit, over the network 150, to an external module (e.g., the server-side DCTA modeling system 270), resulting anonymized/redacted/obfuscated ALS data and UPC.

In one embodiment, the server-side DCTA modeling system 270 is configured to: (1) send, over the network 150, to each external module (e.g., the UPC collection unit 230) deployed at each available electronic device 110, a message that the system 270 is ready to receive UPC and ALS data, and (2) receive, over the network 150, UPC and ALS data from the same external module (e.g., the UPC collection unit 230) or a different external module (e.g., the data security unit 240) deployed at each available electronic device 110.

In one embodiment, the server-side DCTA modeling system 270 is configured to: (1) determine whether a size of UPC and ALS data received exceeds a pre-defined threshold, and (2) in response to determining the size exceeds the pre-defined threshold, build/construct and fit one or more DCTA models based on the UPC and the ALS data received. The UPC and the ALS data received comprises one or more pairs of data. Each pair of data includes ALS data and a user-preferred display CCT received from the same electronic device 110 and corresponding to the same user 160, and each pair of data has corresponding metadata (i.e., demographic metadata, contextual metadata, and/or behavioral metadata received from the same electronic device 110 and corresponding to the same user 160).

A DCTA model built/constructed by the server-side DCTA modeling system 270 may be a universal DCTA model or a per-situation DCTA model. Each universal/per-situation DCTA model is a MLR model built/constructed using one or more pairs of data included in the UPC and the ALS data received, wherein ALS data included in each pair are independent variables, and a user-preferred display CCT included in each pair is a dependent variable.

In one embodiment, the server-side DCTA modeling system 270 comprises a universal DCTA modeling unit 280 configured to build/construct a universal DCTA for all generic users using all available pairs of data included in the UPC and the ALS data received. In one embodiment, a universal DCTA model is built/constructed in accordance with equation (1) provided below:

$$Y_i = \beta_0 + \beta_1 X_{i1} + \beta_2 X_{i2} + \ldots + \beta_p X_{ip} + \varepsilon \qquad (1),$$

wherein $Y_i$ is a user-preferred display CCT for the $i^{th}$ case (dependent variable), $\{X_{i1}, \ldots, X_{ip}\}$ are values of the collected ALS data for the $i^{th}$ case (independent variables; e.g., $X_{ip}$ may indicate an environment CCT), $\beta_0$ is a constant term (intercept), $\{\beta_1, \ldots \beta_p\}$ are the regression coefficients for the independent variables, and $\varepsilon$ is an error term (residuals).

In one embodiment, the server-side DCTA modeling system 270 partitions/splits all available pairs of data included in the UPC and the ALS data received into one or more corresponding user situations based on metadata corresponding to each pair. Each user situation (e.g., users aged 55 years old and above who viewed a romance movie) represents one or more users of a particular demographic in a particular context. In one embodiment, the server-side DCTA modeling system 270 comprises a per-situation DCTA modeling unit 290 configured to build/construct a per-situation DCTA model using only a part of (i.e., not all of) available pairs of data included in the UPC and the ALS data received, in accordance with equation (1) provided above. Each per-situation DCTA model corresponds to a particular user situation, and is built/constructed using only pairs of data corresponding to the user situation.

Each universal/per-situation DCTA model is fitted on the remote computing environment 130. Specifically, for each universal/per-situation DCTA model, the server-side DCTA modeling system 270 (e.g., via the universal DCTA modeling unit 280 or the per-situation DCTA modeling unit 290) is configured to find a relationship between independent variables (ALS data) and a dependent variable (user-preferred display CCT) by finding the best fit line. Each resulting fitted universal/per-situation DCTA model predicts a user-preferred display CCT for given ambient lighting conditions.

In one embodiment, for each fitted universal/per-situation DCTA model, the server-side DCTA modeling system 270 (e.g., via the universal DCTA modeling unit 280 or the per-situation DCTA modeling unit 290) is configured to: (1) check the goodness-of-fit of the fitted universal/per-situation DCTA model based on a $R^2$ metric, (2) determine if the $R^2$ metric exceeds a pre-defined threshold (e.g., 0.8), and (3) in response to determining the $R^2$ metric exceeds the pre-defined threshold, save/update the fitted universal/per-situation DCTA model (e.g., on one or more storage units 132 of the remote computing environment 130).

In one embodiment, the server-side DCTA modeling system 270 distributes, over the network 150, one or more fitted universal/per-situation DCTA models for loading onto or downloading to one or more electronic devices 110.

In one embodiment, the client-side DCTA system 210 comprises a DCTA executor system 250. In one embodiment, the DCTA executor system 250 comprises an ambient light initialization unit 251 configured to perform ambient light initialization. Ambient light initialization is a process that involves adjusting or optimizing an environment CCT of the viewing environment to approximate a current display CCT of the display device 140, such that the environment CCT substantially matches the current display CCT. Specifically, the ambient light initialization unit 251 controls one or more ambient lighting fixtures 180 in the viewing environment by increasing or decreasing a CCT of each of the ambient lighting fixtures 180 until the environment CCT substantially matches the current display CCT. In one embodiment, the ambient light initialization unit 251 controls the ambient lighting fixtures 180 utilizing one or more home automation protocols such as, but not limited to, Wi-Fi, Z-Wave, Zigbee, Bluetooth Low Energy, etc.

In one embodiment, the DCTA executor system 250 comprises a display color temperature (DCT) adjustment unit 252 configured to: (1) receive (e.g., from the server-side DCTA modeling system 270 over the network 150, or a per-individual DCTA modeling unit 262) one or more fitted DCTA models, and (2) perform DCT adjustment. DCT adjustment is a process that involves adjusting one or more color temperature settings of the display device 140 based on a fitted DCTA model. In one embodiment, ambient light initialization is performed before DCT adjustment to approximately optimize an environment CCT, thereafter finetuning (predicting) the user-preferred display CCT while minimizing errors as much as possible. In one embodiment, the DCT adjustment unit 252 performs DCT adjustment by: (1) predicting, utilizing a fitted DCTA model, a user-preferred display CCT based on current ALS data (e.g., collected by the ALS unit 220), and (2) automatically adjusting or optimizing one or more color temperature settings of the display device 140 in accordance with the user-preferred display CCT predicted, such that the resulting current display CCT substantially matches the user-preferred display CCT predicted. In one embodiment, the DCT adjustment unit 252 obtains regression coefficients of the fitted DCTA model, and predicts the user-preferred display CCT based on the coefficients. The fitted DCTA model utilized may be a fitted universal DCTA model, a fitted per-situation DCTA model suitable for a current user situation involving a user 160 within proximity of the display device 140, or a fitted per-individual DCTA model for the user 160. The current user situation is determined based on current demographic metadata, contextual metadata, and/or behavioral metadata (e.g., collected by the UPC collection unit 230).

In one embodiment, DCT adjustment is performed automatically/dynamically without user interaction (i.e., unobtrusively adjusts the color temperature settings of the display device 140). In one embodiment, DCT adjustment is manually triggered in response to a pre-defined event. For example, DCT adjustment may be performed in response to a user command (e.g., a user 160 interacting with an I/O unit 113, such as clicking/pressing a button on a remote control, launching a video streaming app, etc.).

In one embodiment, the client-side DCTA system 210 comprises a user feedback and personalization (UFP) system 260. In one embodiment, the UFP system 260 comprises a data refinement unit 261 configured to collect, from each individual user 160, corresponding user feedback indicative of user satisfaction with DCT adjustment. The user 160 may interact with an I/O unit 113 to provide the user feedback (e.g., clicking/pressing a button on a remote control, etc.). The user satisfaction may be a qualitative measurement (e.g., a review such as good or bad) or a quantitative measurement (e.g., a rating out of 5 stars).

In one embodiment, the data refinement unit 261 is configured to continuously collect user feedback from a user 160. The collection of user feedback comprises one or more data instances, wherein each data instance comprises ALS data, a user-preferred display CCT predicted based on the ALS data, and corresponding metadata indicative of user satisfaction with DCT adjustment that is based on the user-preferred display CCT predicted.

In one embodiment, the UFP system 260 comprises a per-individual DCTA modeling unit 262 configured to build/construct a per-individual DCTA model for a specific user 160. A per-individual DCTA model is a MLR model personalized for an individual user 160 based on data instances with high user satisfaction included in a collection of user feedback corresponding to the user 160. Specifically, if the number of data instances with high user satisfaction (e.g., the number of data instances with ratings greater than 4 stars) included in a collection of user feedback corresponding to a user 160 exceeds a pre-defined threshold, the per-individual DCTA modeling unit 262 builds/constructs a per-individual DCTA model for the user 160 using at least the data instances with high user satisfaction, in accordance with equation (1) provided above.

To reduce or minimize potential data privacy risks, each per-individual DCTA model built/constructed is fitted on the electronic device 110 (i.e., on-device computation) instead of on the remote computing environment 130. Specifically, for each per-individual DCTA model, the per-individual DCTA modeling unit 262 is configured to find a relationship between independent variables (ALS data) and a dependent variable (user-preferred display CCT) by finding the best fit line. Each resulting fitted per-individual DCTA model predicts a user-preferred display CCT for given ambient lighting conditions.

In one embodiment, for each fitted per-individual DCTA model, the per-individual DCTA modeling unit 262 is configured to: (1) check the goodness-of-fit of the fitted per-individual DCTA model based on a $R^2$ metric, (2) determine if the $R^2$ metric exceeds a pre-defined threshold (e.g., 0.8), and (3) in response to determining the $R^2$ metric exceeds the pre-defined threshold, save/update the fitted per-individual DCTA model (e.g., on one or more storage units 112 of the electronic device 110).

In one embodiment, the per-individual DCTA modeling unit 262 continuously updates a per-individual DCTA model for a user 160 in response to the user 160 providing additional user feedback.

In one embodiment, the system 200 implements federated learning. For example, in one embodiment, one or more parameters of a per-individual DCTA model are aggregated, and transmitted, over the network 150, from the client-side DCTA modeling system 210 to the server-side DCTA modeling system 270. To reduce or minimize potential data privacy risks, the parameters are aggregated without data instances (e.g., via the data security unit 240). The resulting aggregated parameters are then used to construct a more robust and generalizable universal DCTA model, via the universal DCTA modeling unit 280.

Figure 3:
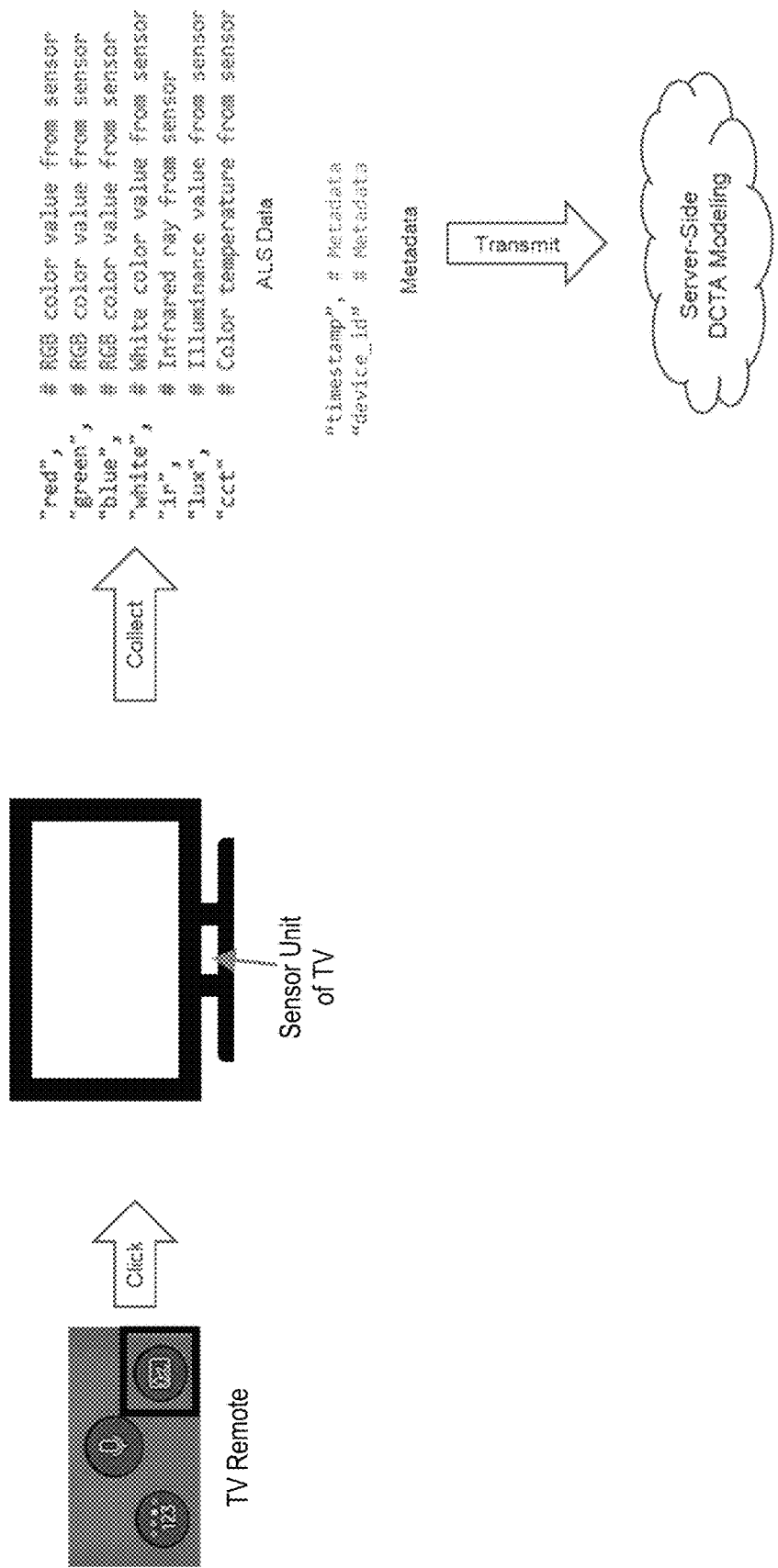
FIG. 3 illustrates an example user interaction involving an ambient light sensing (ALS) unit, in one or more embodiments.

FIG. 3 illustrates an example user interaction involving an ALS unit 220, in one or more embodiments. As shown in FIG. 3, when a user 160 within proximity of an electronic device 110 (e.g., a smart TV) interacts with an I/O unit 113, such as clicking a button on a remote control, an ALS unit 220 deployed at the electronic device 110 triggers one or more sensor units 114 of the electronic device 110 to collect current ALS data indicative of one or more current ambient lighting conditions in a viewing environment of the user 160. The current ALS data may include measurements such as, but not limited to, RGB color, white color, IR, illuminance, and CCT of the viewing environment.

The ALS unit 220 also collects metadata corresponding to the current ALS data. The metadata may include, but is not limited to, a timestamp, a unique ID of the electronic device 110 and/or the display device 140, an IP address, etc.

The current ALS data and the corresponding metadata are transmitted (e.g., from either a UPC collection unit 230 or a data security unit 240 deployed at the electronic device 110) to an external module (e.g., the server-side DCTA modelling system 270) over a network 150.

Figure 4:
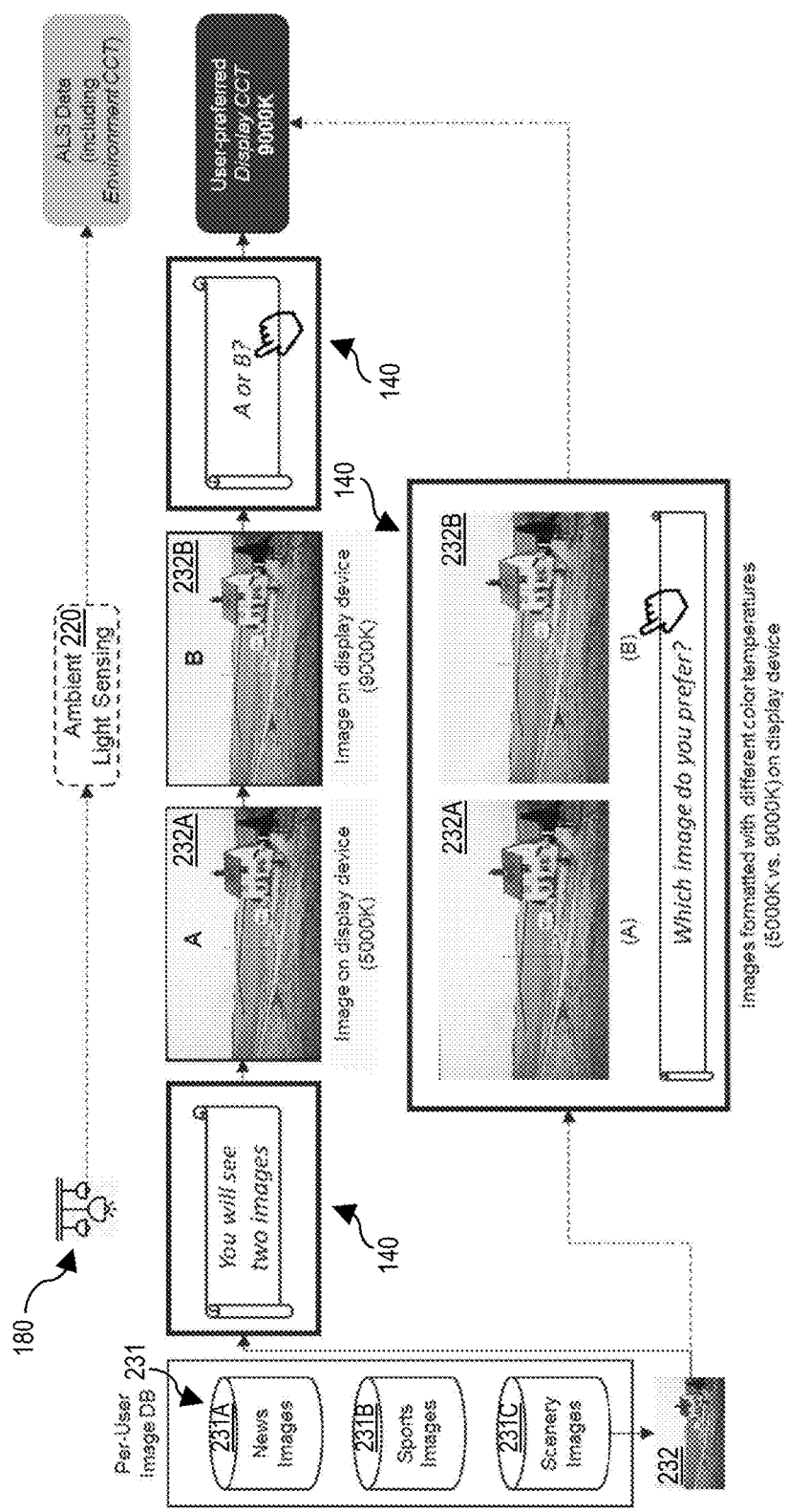
FIG. 4 illustrates an example user interaction involving a user preferences and characteristics (UPC) unit, in one or more embodiments.

FIG. 4 illustrates an example user interaction involving a UPC unit 230, in one or more embodiments. In one embodiment, for each user 160, a UPC collection unit 230 deployed at an electronic device 110 (e.g., a smart TV) maintains one or more corresponding per-user image databases 231. Each per-user image database 231 corresponding to a user 160 maintains one or more images sampled from one or more pieces of content the user 160 watched on the display device 140, wherein the one or more images are grouped into a particular category (e.g., news, sports, scenery, cartoon). For example, for each user 160, the UPC collection unit 230 may maintain a per-user image database 231A comprising news images (i.e., images grouped into news), a per-user image database 231B comprising sports images (i.e., images grouped into sports), and/or a per-user image database 231C comprising scenery images (i.e., images grouped into scenery).

In one embodiment, the UPC collection unit 230 collects UPC corresponding to a user 160 by presenting an image 232, retrieved from a corresponding per-user image database 231, on a display device 140 integrated into, or coupled to, the electronic device 110. In one embodiment, the image 232 is sequentially presented using at least two different color temperature settings. For example, as shown in FIG. 4, the user 160 is presented with a sequence of messages/images in the following order: (1) a message indicating the user 160 will see two images, (2) a first image 232A (labelled as "A" in FIG. 4) representing the image 232 formatted with a color temperature of 5000K, (3) a second image 232B (labelled as "B" in FIG. 4) representing the image 232 formatted with a color temperature of 9000K, and (4) a message prompting the user 160 to select which of the two images presented the user 160 prefers, wherein the user-preferred display CCT is set based on the selected image. For example, if the user 160 selects the second image 232B, the user-preferred display CCT is set to 9000K.

In another embodiment, images 232 formatted with at least two different color temperature settings are presented simultaneously. For example, as shown in FIG. 4, the user 160 is presented with the following simultaneously: (1) the first image 232A, (3) the second image 232B, and (3) a message prompting the user 160 to select which of the two images presented the user 160 prefers, wherein the user-preferred display CCT is set based on the selected image. For example, if the user 160 selects the second image 232B, the user-preferred display CCT is set to 9000K.

In one embodiment, ALS data (collected by an ALS unit 220 deployed at the electronic device 110) and UPC including the user-preferred display CCT are transmitted (e.g., from either the UPC collection unit 230 or a data security unit 240 deployed at the electronic device 110) to an external module (e.g., the server-side DCTA modelling system 270) over a network 150.

Figure 5:
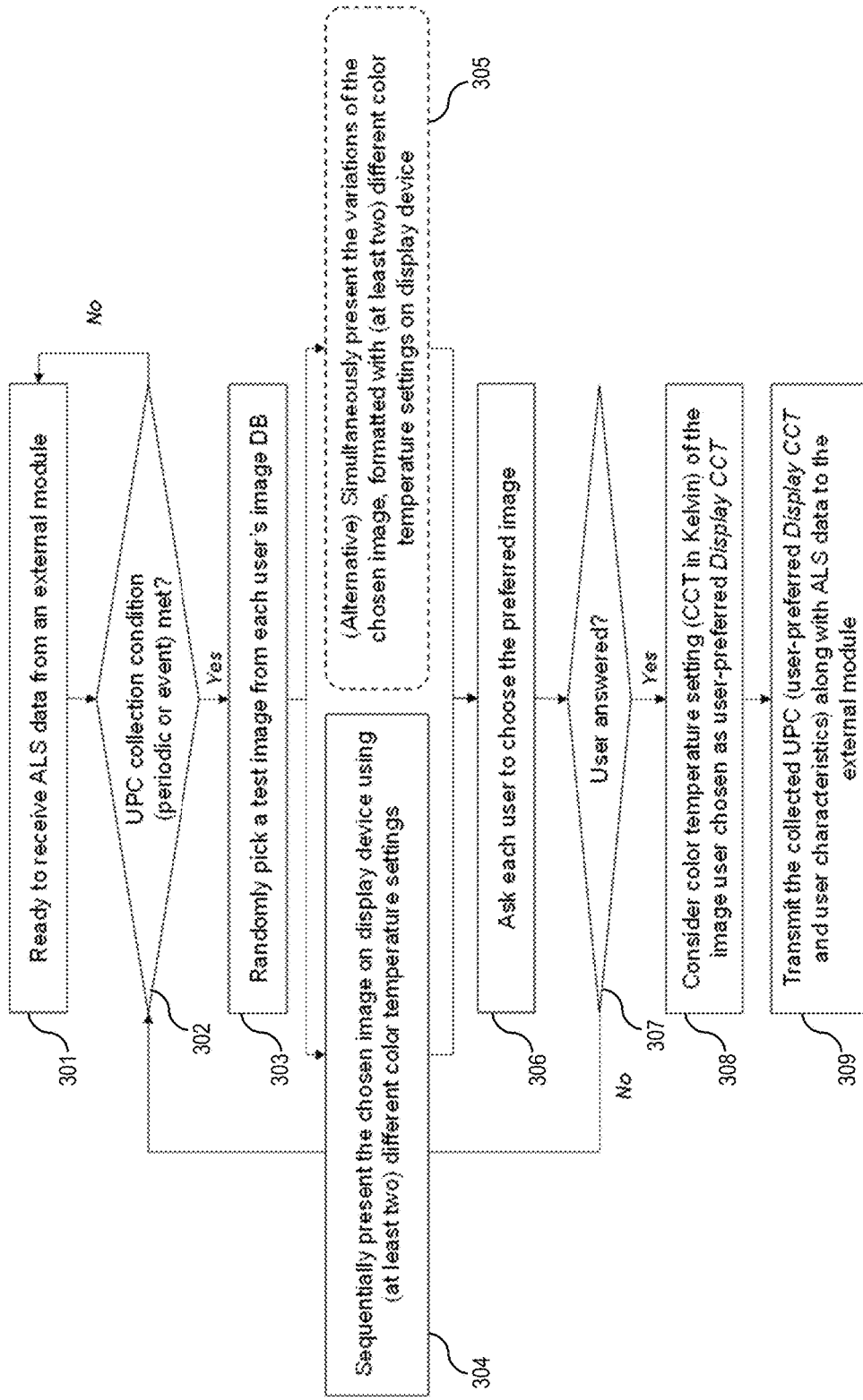
FIG. 5 is a flowchart of an example process for collecting UPC, in one or more embodiments.

FIG. 5 is a flowchart of an example process 300 for collecting UPC, in one or more embodiments. Process block 301 includes receiving a message from an external module (e.g., the server-side DCTA modeling system 270) that the external module is ready to receive ALS data. Process block 302 includes determining whether a UPC collection condition (i.e., a periodic condition or an event-based condition) has been met. If the UPC collection condition has been met, the process 300 continues to process block 303. If the UPC collection condition has not been met, the process 300 returns to process block 301.

Process block 303 includes randomly picking a test image (e.g., an image 232) from each user's image database (e.g., a per-user image database 231). After process block 303, the process 300 continues to either process block 304 in one embodiment, or process block 305 in another embodiment.

Process block 304 includes sequentially presenting the chosen image (i.e., the test image randomly picked in process block 303) using at least two different color temperature settings on a display device (e.g., a display device 140).

Process block 305 includes simultaneously presenting variations of the chosen image on the display device, wherein the variations are the chosen image formatted with at least two different color temperature settings.

Process block 306 includes asking each user to choose the user's preferred image from what was presented on the display device.

Process block 307 includes determining whether a user has answered (i.e., chosen the user's preferred image). If the user has answered, the process 300 continues to process block 308. If the user has not answered, the process 300 returns to process block 302.

Process block 308 includes considering (i.e., setting) the color temperature setting of the user's preferred image as a user-preferred display CCT.

Process block 309 includes transmitting collected UPC, including the user-preferred display CCT, and collected ALS data (e.g., collected by the ALS unit 220) to the external module (e.g., the server-side DCTA modeling system 270).

In one embodiment, process blocks 301-309 may be performed by one or more components of the client-side DCTA system 210 such as, but not limited to, the UPC collection unit 230.

Figure 6:
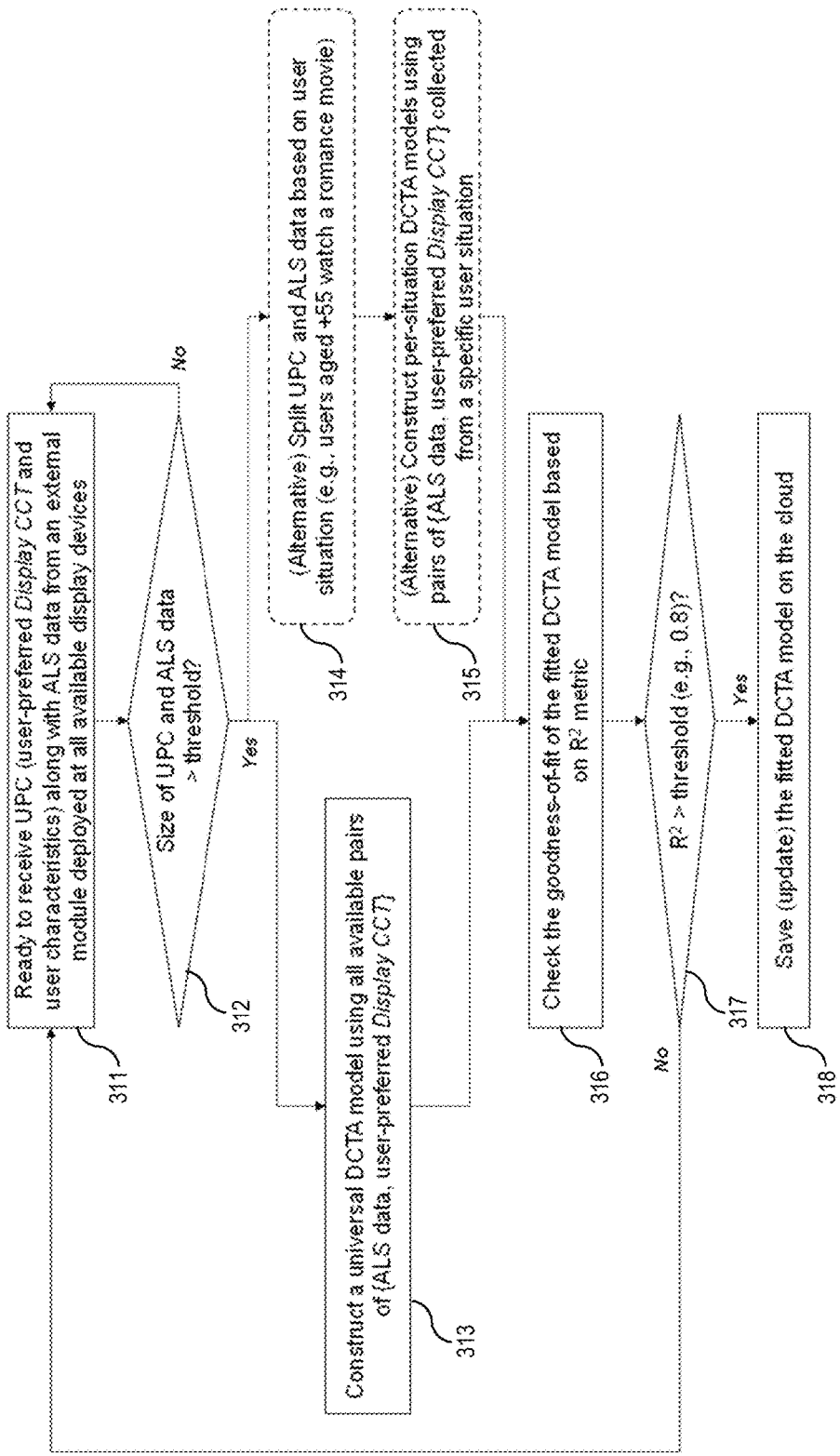
FIG. 6 is a flowchart of an example process for building/constructing and fitting one or more DCTA models, in one or more embodiments.

FIG. 6 is a flowchart of an example process 310 for building/constructing and fitting one or more DCTA models, in one or more embodiments. Process block 311 includes sending a message indicating readiness to receive UPC and ALS data to each external module (e.g., the UPC collection unit 230) deployed at each available display device (e.g., a display device 140 integrated into, or coupled to, an electronic device 110). Process block 312 includes determining whether a size of UPC and ALS data received exceeds a pre-defined threshold. If the size exceeds the pre-defined threshold, the process 310 continues to either process block 313 in one embodiment, or process block 314 in another embodiment. If the size does not exceed the pre-defined threshold, the process 310 returns to process block 311.

Process block 313 includes building/constructing and fitting a universal DCTA model using all available pairs of data included in the UPC and the ALS data received, wherein each pair of data includes ALS data and a user-preferred display CCT received from the same display device.

Process block 314 includes splitting/grouping all the available pairs of data included into one or more corresponding user situations (e.g., users aged 55 and above who view a romance movie is one example user situation). Process block 315 includes, for each user situation, building/constructing and fitting a corresponding per-situation DCTA model using only pairs of data corresponding to the user situation.

Process block 316 includes checking the goodness-of-fit of the fitted DCTA model (i.e., universal DCTA model or per-situation DCTA model) based on $R^2$ metric. Process block 317 includes whether the $R^2$ metric exceeds a pre-defined threshold (e.g., 0.8). If the $R^2$ metric exceeds the pre-defined threshold, the process 310 continues to process block 318. If the $R^2$ metric does not exceed the pre-defined threshold, the process 310 returns to process block 311.

Process block 318 includes saving/updating the fitted DCTA model on the cloud (e.g., on one or more storage units 132 of the remote computing environment 130).

In one embodiment, process blocks 311-318 may be performed by one or more components of the server-side DCTA modeling system 270 such as, but not limited to, the universal DCTA modeling unit 280 and/or the per-situation DCTA modeling unit 290.

Figure 7:
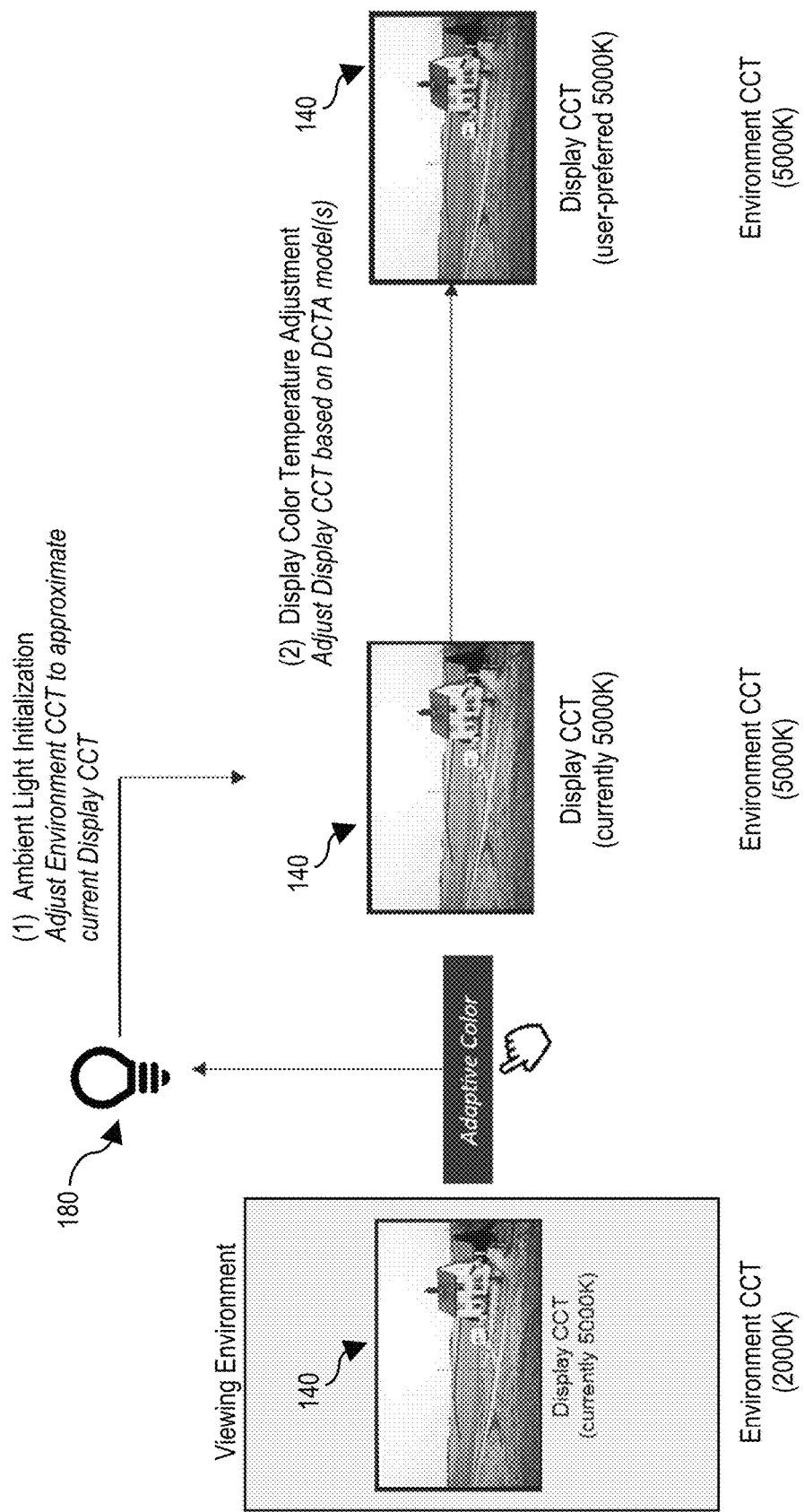
FIG. 7 illustrates an example user interaction involving a DCTA executor system, in one or more embodiments.

FIG. 7 illustrates an example user interaction involving a DCTA executor system 250, in one or more embodiments. Assume a current display CCT of a display device 140 integrated into, or coupled to, an electronic device 110 (e.g., a smart TV) is 5000K, and an environment CCT of a viewing environment within proximity of the display device 140 is 2000K. In one embodiment, DCT adjustment is manually triggered in response to a pre-defined event. For example, as shown in FIG. 7, DCT adjustment may be performed in response to a user selection of a button (e.g., a physical button on an I/O unit 113, such as on a remote control, or a button included in a GUI displayed on the display device 140).

In one embodiment, before performing DCT adjustment, a DCTA executor system 250 deployed on the electronic device 110 performs ambient light initialization (via the ambient light initialization unit 251) to adjust the environment CCT to approximate the current display CCT. As shown in FIG. 7, the DCTA executor system 250 increases a CCT of one or more ambient lighting fixtures 180 in the viewing environment until the environment CCT substantially matches the current display CCT, i.e., the environment CCT increases to 5000K.

After the ambient light initialization, the DCTA executor system 250 performs DCT adjustment (via the DCT adjustment unit 252) to adjust one or more color temperature settings of the display device 140 based on one or more fitted DCTA models (e.g., a universal DCTA model, a per-situation DCTA model, or a per-individual DCTA model). Specifically, the system 250 predicts, utilizing the one or more fitted DCTA models, a user-preferred display CCT based on current ALS data (collected by the ALS unit 220), and adjusts one or more color temperature settings of the display device 140 in accordance with the user-preferred display CCT predicted. As shown in FIG. 7, if the user-preferred display CCT predicted is 6500K, the display CCT is increased to 6500K.

Figure 8:
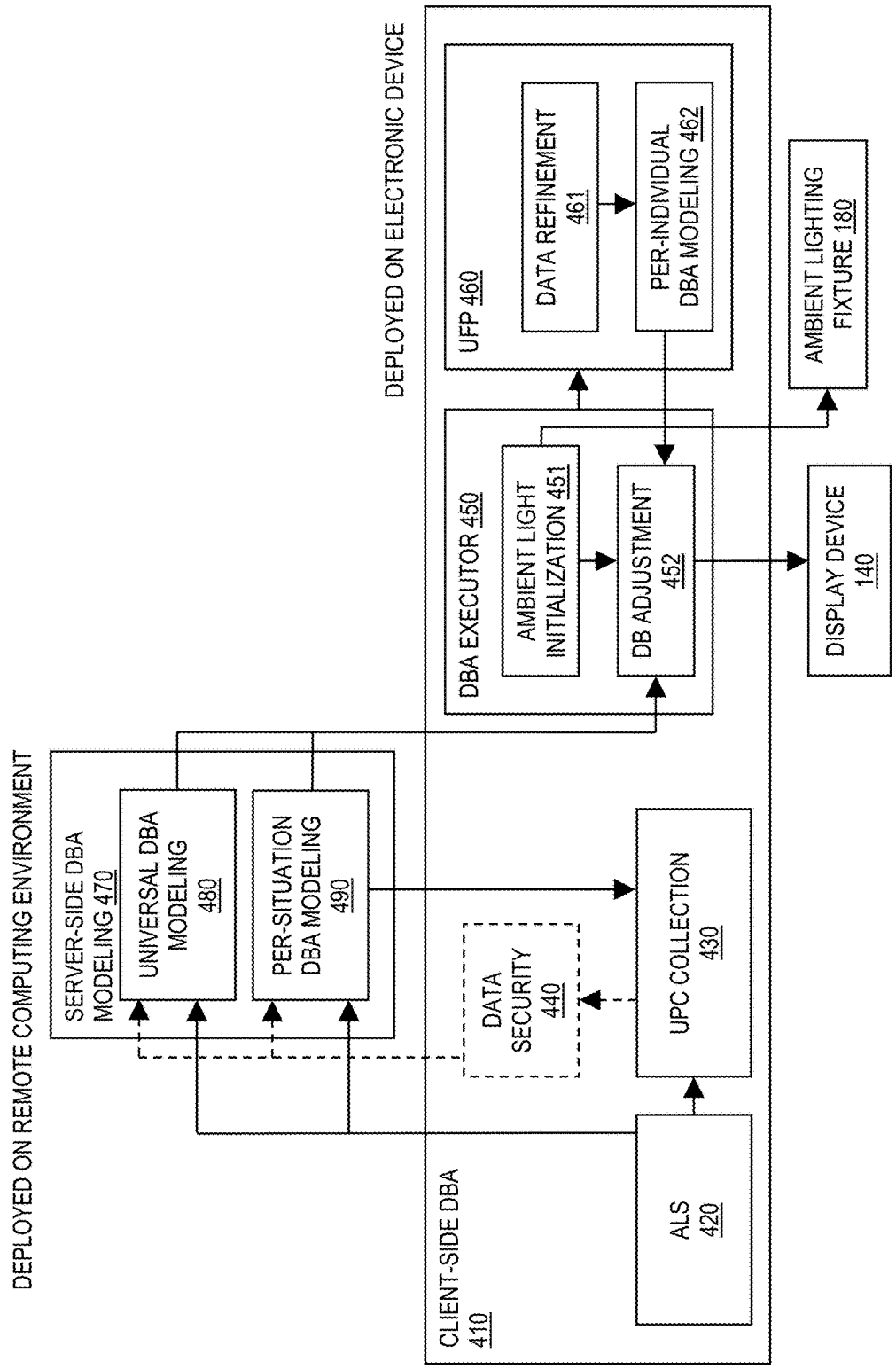
FIG. 8 illustrates an example system for implementing display brightness adaptation (DBA) and DBA modeling, in one or more embodiments.

FIG. 8 illustrates an example system 400 for implementing DBA and DBA modeling, in one or more embodiments. The system 400 comprises: (1) a client-side DBA system 410 configured to perform DBA, and (2) a server-side DBA modeling system 470 configured to perform DBA modeling.

In one embodiment, the client-side DBA system 410 is deployed at an electronic device 110 that a display device 140 is integrated into, or coupled to. For example, the client-side DBA system 410 is integrated into, or implemented as part of, the client-side display adaptation system 120 in FIG. 1.

In one embodiment, the server-side DBA modeling system 470 is deployed at a remote computing environment 130. For example, the server-side DBA modeling system 470 is integrated into, or implemented as part of, the server-side display adaptation modeling system 170 in FIG. 1.

In one embodiment, the client-side DBA system 410 comprises an ALS unit 420 configured to collect, utilizing one or more sensor units 114, current ALS data indicative of one or more current ambient lighting conditions in a viewing environment of one or more users 160 within proximity of a display device 140. In one embodiment, the current ALS data includes one or more measurements such as, but not limited to, measurements of RGB color, a measurement of white color, a measurement of illuminance in units of lux, a measurement of environment color temperature in degrees Kelvin, and a measurement of IR or infrared light.

In one embodiment, the ALS unit 420 is configured to collect ALS data without user interaction (i.e., unobtrusively collect ALS data). In one embodiment, the ALS unit 420 is configured to collect ALS data periodically (e.g., in accordance with a pre-defined time interval). For example, ALS data may be collected every thirty minutes.

In one embodiment, the ALS unit 420 is configured to collect ALS data in response to a pre-defined event. For example, ALS data may be collected in response to a user 160 interacting with an I/O unit 113 (e.g., clicking/pressing a button on a remote control for the display device 140, launching a video streaming app, etc.).

In one embodiment, the ALS unit 420 is further configured to collect metadata corresponding to current ALS data for use in distinguishing the current ALS data from other ALS data (e.g., collected at a different time, collected in a different viewing environment, etc.). In one embodiment, metadata corresponding to ALS data is indicative of context, the electronic device 110 and/or the display device 140, and/or each user 160. Examples of metadata include, but are not limited to, a timestamp, a unique identification (ID) of the electronic device 110 and/or the display device 140, an IP address, etc.

In one embodiment, the ALS unit 420 transmits a set of ALS data to an internal module of the client-side DBA system 410 after the set is collected. In another embodiment, the ALS unit 420 aggregates one or more sets of ALS data after the one or more sets are collected, and transmits the resulting aggregated set to an internal module of the client-side DBA system 410.

In one embodiment, the client-side DBA system 410 comprises a UPC collection unit 430 configured to collect, for each user 160, corresponding UPC. In one embodiment, UPC corresponding to a user 160 include, but are not limited to, a user-preferred display brightness indicative of a level of brightness preferred by the user 160 for the display device 140. For example, in one embodiment, the UPC collection unit 430 collects UPC corresponding to a user 160 by sequentially presenting an image using at least two different brightness settings to the user 160 on the display device 140. As another example, in one embodiment, the UPC collection unit 430 collects UPC corresponding to a user 160 by simultaneously presenting images formatted with at least two different brightness settings to the user 160 on the display device 140, and prompting the user 160 to select which of the images presented the user 160 most prefers (i.e., most preferred image).

In one embodiment, images the UPC collection unit 430 presents on the display device 140 may be sampled from one or more pieces of content each user 160 had viewed on the display device 140. In one embodiment, images the UPC collection unit 430 presents on the display device 140 may be grouped into one or more categories (e.g., news, sports, scenery, cartoon). In one embodiment, for each user 160, the UPC collection unit 430 maintains one or more corresponding per-user image databases (e.g., on one or more storage units 112 of the electronic device 110). Each per-user image database corresponding to a user 160 maintains one or more images sampled from one or more pieces of content the user 160 watched on the display device 140, wherein the one or more images are grouped into a particular category (e.g., news, sports, scenery, cartoon). In another embodiment, the UPC collection unit 430 maintains one or more general image databases (e.g., on one or more storage units 112 of the electronic device 110), wherein each general image database comprises one or more images grouped into a particular category.

In one embodiment, the UPC collection unit 430 is configured to: (1) receive a message from an external module (e.g., the server-side DBA modeling system 470) that the external module is ready to receive ALS data, (2) determine whether a UPC collection condition has been met, and (3) in response to determining the UPC collection condition has been met, collect UPC. The UPC collection condition may be either a periodic condition representing a pre-defined time interval or an event-based condition representing a pre-defined event. If the UPC collection condition is the periodic condition, the UPC collection unit 430 collects UPC periodically in accordance with the pre-defined time interval. For example, UPC may be collected every Wednesday evening. If the UPC collection condition is the event-based condition, the UPC collection unit 430 collects UPC when the pre-defined event occurs (e.g., a pre-defined user interaction). For example, UPC corresponding to a user 160 may be collected in response to the user 160 interacting with an I/O unit 113 (e.g., clicking/pressing a button on a remote control, launching a video streaming app, etc.).

In one embodiment, UPC corresponding to a user 160 include metadata such as, but not limited to, demographic metadata (e.g., race, age, gender, etc.), contextual metadata (e.g., genre and title of pieces of content the user 160 is watching), and/or behavioral metadata. In one embodiment, the UPC collection unit 430 collects demographic metadata (e.g., gender) corresponding to a user 160 via self-report. In another embodiment, the UPC collection unit 430 collects contextual metadata (e.g., content title) corresponding to a user 160 utilizing ACR techniques. As described in detail later herein, metadata collected by the UPC collection unit 430 is used to build one or more per-situation DBA models.

In one embodiment, the UPC collection unit 430 receives ALS data from the ALS unit 420, collects UPC, and transmits the ALS data together with the UPC. In another embodiment, the UPC collection unit 430 receives ALS data from the ALS unit 420, collects one or more instances of UPC, aggregates the one or more instances, and transmits the ALS data together with the resulting aggregated instance of UPC.

In one embodiment, the UPC collection unit 430 transmits, over the network 150, to an external module (e.g., the server-side DBA modeling system 470), ALS data and UPC.

In another embodiment, the UPC collection unit 430 transmits, to an internal module of the client-side DBA system 410, ALS data together with UPC. Specifically, to reduce or minimize potential data privacy risks, the client-side DBA system 410 comprises an optional data security unit 440 that the UPC collection unit 430 transmits ALS data and UPC to. The data security unit 440 is configured to: (1) receive, from the UPC collection unit 430, ALS data and UPC, (2) anonymize/redact/obfuscate the ALS data and the UPC to protect sensitive personal data (e.g., race, age, gender) included therein, and (3) transmit, over the network 150, to an external module (e.g., the server-side DBA modeling system 470), resulting anonymized/redacted/obfuscated ALS data and UPC.

In one embodiment, the server-side DBA modeling system 470 is configured to: (1) send, over the network 150, to each external module (e.g., the UPC collection unit 430) deployed at each available electronic device 110, a message that the system 470 is ready to receive UPC and ALS data, and (2) receive, over the network 150, UPC and ALS data from the same external module (e.g., the UPC collection unit 430) or a different external module (e.g., the data security unit 440) deployed at each available electronic device 110.

In one embodiment, the server-side DBA modeling system 470 is configured to: (1) determine whether a size of UPC and ALS data received exceeds a pre-defined threshold, and (2) in response to determining the size exceeds the pre-defined threshold, build/construct and fit one or more DBA models based on the UPC and the ALS data received. The UPC and the ALS data received comprises one or more pairs of data. Each pair of data includes ALS data and a user-preferred display brightness received from the same electronic device 110 and corresponding to the same user 160, and each pair of data has corresponding metadata (i.e., demographic metadata, contextual metadata, and/or behavioral metadata received from the same electronic device 110 and corresponding to the same user 160).

A DBA model built/constructed by the server-side DBA modeling system 470 may be a universal DBA model or a per-situation DBA model. Each universal/per-situation DBA model is a MLR model built/constructed using one or more pairs of data included in the UPC and the ALS data received, wherein ALS data included in each pair are independent variables, and a user-preferred display brightness included in each pair is a dependent variable.

In one embodiment, the server-side DBA modeling system 470 comprises a universal DBA modeling unit 480 configured to build/construct a universal DBA for all generic users using all available pairs of data included in the UPC and the ALS data received. In one embodiment, a universal DBA model is built/constructed in accordance with equation (2) provided below:

$$Y_i = \beta_0 + \beta_1 X_{i1} + \beta_2 X_{i2} + \ldots + \beta_p X_{ip} + \varepsilon \quad (2),$$

wherein $Y_i$ is a user-preferred display brightness for the $i^{th}$ case (dependent variable), $\{X_{i1}, \ldots, X_{ip}\}$ are values of the collected ALS data for the $i^{th}$ case (independent variables; e.g., $X_{ip}$ may indicate an environment illuminance), $\beta_0$ is a constant term (intercept), $\{\beta_1, \ldots \beta_p\}$ are the regression coefficients for the independent variables, and £ is an error term (residuals).

In one embodiment, the server-side DBA modeling system 470 partitions/splits all available pairs of data included in the UPC and the ALS data received into one or more corresponding user situations based on metadata corresponding to each pair. Each user situation (e.g., users aged 55 years old and above who viewed a romance movie) represents one or more users of a particular demographic in a particular context. In one embodiment, the server-side DBA modeling system 470 comprises a per-situation DBA modeling unit 490 configured to build/construct a per-situation DBA model using only a part of (i.e., not all of) available pairs of data included in the UPC and the ALS data received, in accordance with equation (2) provided above. Each per-situation DBA model corresponds to a particular user situation, and is built/constructed using only pairs of data corresponding to the user situation.

Each universal/per-situation DBA model is fitted on the remote computing environment 130. Specifically, for each universal/per-situation DBA model, the server-side DBA modeling system 470 (e.g., via the universal DBA modeling unit 480 or the per-situation DBA modeling unit 490) is configured to find a relationship between independent variables (ALS data) and a dependent variable (user-preferred display brightness) by finding the best fit line. Each resulting fitted universal/per-situation DBA model predicts a user-preferred display brightness for given ambient lighting conditions.

In one embodiment, for each fitted universal/per-situation DBA model, the server-side DBA modeling system 470 (e.g., via the universal DBA modeling unit 480 or the per-situation DBA modeling unit 490) is configured to: (1) check the goodness-of-fit of the fitted universal/per-situation DBA model based on a $R^2$ metric, (2) determine if the $R^2$ metric exceeds a pre-defined threshold (e.g., 0.8), and (3) in response to determining the $R^2$ metric exceeds the pre-defined threshold, save/update the fitted universal/per-situation DBA model (e.g., on one or more storage units 132 of the remote computing environment 130).

In one embodiment, the server-side DBA modeling system 470 distributes, over the network 150, one or more fitted universal/per-situation DBA models for loading onto or downloading to one or more electronic devices 110.

In one embodiment, the client-side DBA system 410 comprises a DBA executor system 450. In one embodiment, the DBA executor system 450 comprises an ambient light initialization unit 451 configured to perform ambient light initialization. Ambient light initialization is a process that involves adjusting or optimizing an environment illuminance of the viewing environment to approximate a current display brightness of the display device 140, such that the environment illuminance substantially matches the current display brightness. Specifically, the ambient light initialization unit 451 controls one or more ambient lighting fixtures 180 in the viewing environment by increasing or decreasing a level of brightness of each of the ambient lighting fixtures 180 until the environment illuminance substantially matches the current display brightness. In one embodiment, the ambient light initialization unit 451 controls the ambient lighting fixtures 180 utilizing one or more home automation protocols such as, but not limited to, Wi-Fi, Z-Wave, Zigbee, Bluetooth Low Energy, etc.

In one embodiment, the DBA executor system 450 comprises a display brightness (DB) adjustment unit 452 configured to: (1) receive (e.g., from the server-side DBA modeling system 470 over the network 150, or a per-individual DBA modeling unit 462) one or more fitted DBA models, and (2) perform DB adjustment. DB adjustment is a process that involves adjusting one or more brightness settings of the display device 140 based on a fitted DBA model. In one embodiment, ambient light initialization is performed before DB adjustment to approximately optimize an environment illuminance, thereafter finetuning (predicting) the user-preferred display brightness while minimizing errors as much as possible. In one embodiment, the DB adjustment unit 452 performs DB adjustment by: (1) predicting, utilizing a fitted DBA model, a user-preferred display brightness based on current ALS data (e.g., collected by the ALS unit 420), and (2) automatically adjusting or optimizing one or more brightness settings of the display device 140 in accordance with the user-preferred display brightness predicted, such that the resulting current display brightness substantially matches the user-preferred display brightness predicted. In one embodiment, the DB adjustment unit 452 obtains regression coefficients of the fitted DBA model, and predicts the user-preferred display brightness based on the coefficients. The fitted DBA model utilized may be a fitted universal DBA model, a fitted per-situation DBA model suitable for a current user situation involving a user 160 within proximity of the display device 140, or a fitted per-individual DBA model for the user 160. The current user situation is determined based on current demographic metadata, contextual metadata, and/or behavioral metadata (e.g., collected by the UPC collection unit 430).

In one embodiment, DB adjustment is performed automatically/dynamically without user interaction (i.e., unobtrusively adjusts the brightness settings of the display device 140). In one embodiment, DB adjustment is manually triggered in response to a pre-defined event. For example, DB adjustment may be performed in response to a user command (e.g., a user 160 interacting with an I/O unit 113, such as clicking/pressing a button on a remote control, launching a video streaming app, etc.).

In one embodiment, the client-side DBA system 410 comprises a user feedback and personalization (UFP) system 460. In one embodiment, the UFP system 460 comprises a data refinement unit 461 configured to collect, from each individual user 160, corresponding user feedback indicative of user satisfaction with DB adjustment. The user 160 may interact with an I/O unit 113 to provide the user feedback (e.g., clicking/pressing a button on a remote control, etc.). The user satisfaction may be a qualitative measurement (e.g., a review such as good or bad) or a quantitative measurement (e.g., a rating out of 5 stars).

In one embodiment, the data refinement unit 461 is configured to continuously collect user feedback from a user 160. The collection of user feedback comprises one or more data instances, wherein each data instance comprises ALS data, a user-preferred display brightness predicted based on the ALS data, and corresponding metadata indicative of user satisfaction with DB adjustment that is based on the user-preferred display brightness predicted.

In one embodiment, the UFP system 460 comprises a per-individual DBA modeling unit 462 configured to build/construct a per-individual DBA model for a specific user 160. A per-individual DBA model is a MLR model personalized for an individual user 160 based on data instances with high user satisfaction included in a collection of user feedback corresponding to the user 160. Specifically, if the number of data instances with high user satisfaction (e.g., the number of data instances with ratings greater than 4 stars) included in a collection of user feedback corresponding to a user 160 exceeds a pre-defined threshold, the per-individual DBA modeling unit 462 builds/constructs a per-individual DBA model for the user 160 using at least the data instances with high user satisfaction, in accordance with equation (2) provided above.

To reduce or minimize potential data privacy risks, each per-individual DBA model built/constructed is fitted on the electronic device 110 (i.e., on-device computation) instead of on the remote computing environment 130. Specifically, for each per-individual DBA model, the per-individual DBA modeling unit 462 is configured to find a relationship between independent variables (ALS data) and a dependent variable (user-preferred display brightness) by finding the best fit line. Each resulting fitted per-individual DBA model predicts a user-preferred display brightness for given ambient lighting conditions.

In one embodiment, for each fitted per-individual DBA model, the per-individual DBA modeling unit 462 is configured to: (1) check the goodness-of-fit of the fitted per-individual DBA model based on a $R^2$ metric, (2) determine if the $R^2$ metric exceeds a pre-defined threshold (e.g., 0.8), and (3) in response to determining the $R^2$ metric exceeds the pre-defined threshold, save/update the fitted per-individual DBA model (e.g., on one or more storage units 112 of the electronic device 110).

In one embodiment, the per-individual DBA modeling unit 462 continuously updates a per-individual DBA model for a user 160 in response to the user 160 providing additional user feedback.

In one embodiment, the system 400 implements federated learning. For example, in one embodiment, one or more parameters of a per-individual DBA model are aggregated, and transmitted, over the network 150, from the client-side DBA modeling system 410 to the server-side DBA modeling system 470. To reduce or minimize potential data privacy risks, the parameters are aggregated without data instances (e.g., via the data security unit 440). The resulting aggregated parameters are then used to construct a more robust and generalizable universal DBA model, via the universal DBA modeling unit 480.

Figure 9:
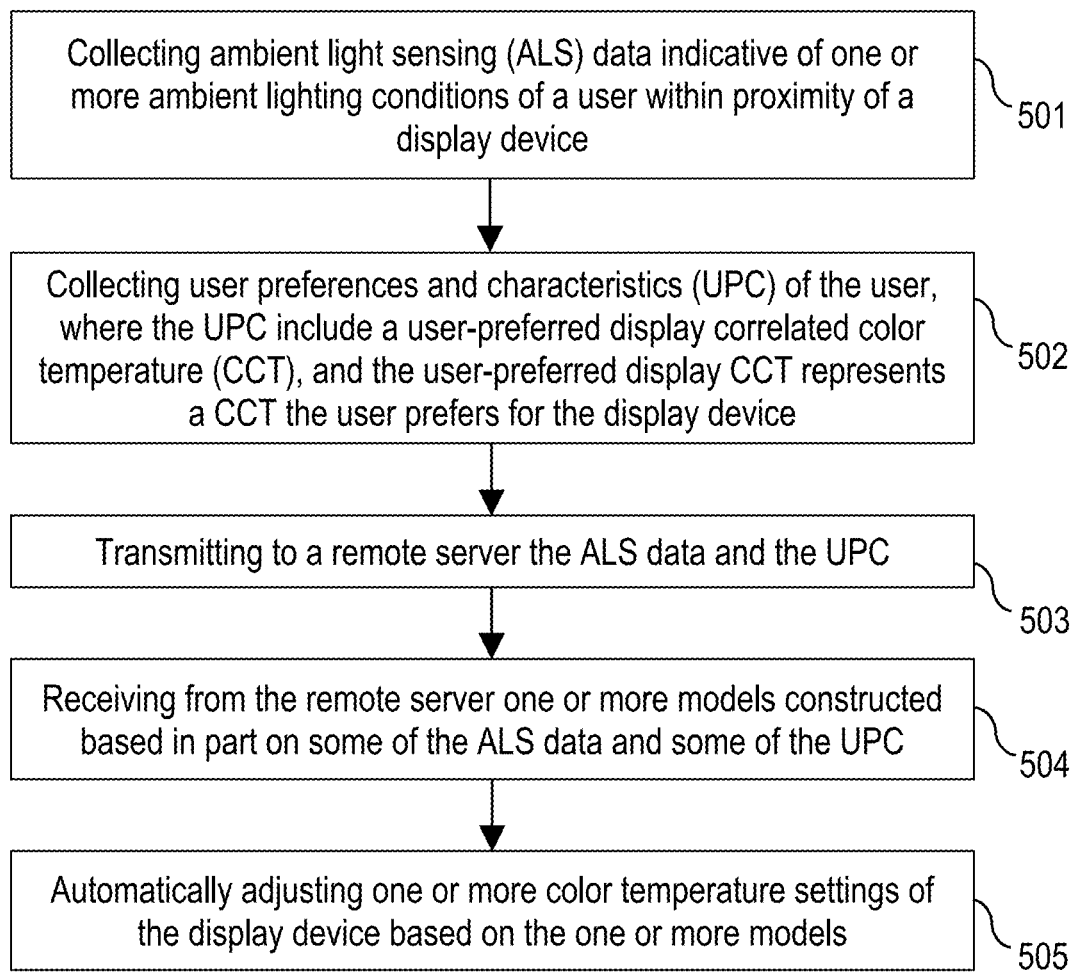
FIG. 9 is a flowchart of an example process for personalized color temperature adaptation, in one or more embodiments.

FIG. 9 is a flowchart of an example process 500 for personalized color temperature adaptation, in one or more embodiments. Process block 501 includes collecting ALS data indicative of one or more ambient lighting conditions of a user within proximity of a display device. Process block 502 includes collecting UPC of the user, wherein the UPC include a user-preferred display CCT, and the user-preferred display CCT represents a CCT the user prefers for the display device. Process block 503 includes transmitting to a remote server the ALS data and the UPC. Process 504 includes receiving from the remote server one or more models constructed based in part on some of the ALS data and some of the UPC. Process 505 includes automatically adjusting one or more color temperature settings of the display device based on the one or more models.

In one embodiment, process blocks 501-505 may be performed by one or more components of the client-side DCTA system 210 such as, but not limited to, the ALS unit 220, the UPC collection unit 230, and/or the DCTA executor system 250.

Figure 10:
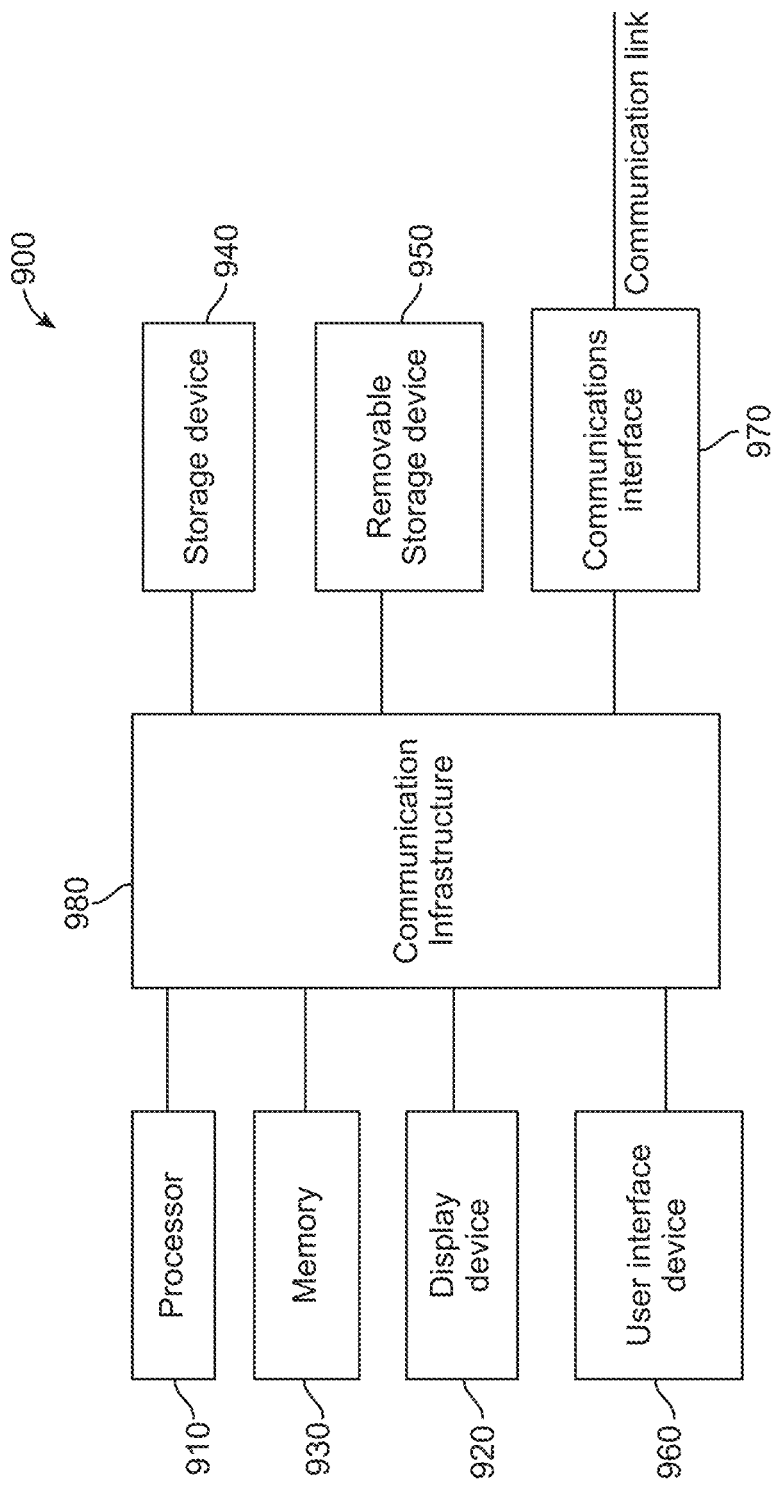
FIG. 10 is a high-level block diagram showing an information processing system comprising a computer system useful for implementing the disclosed embodiments.

FIG. 10 is a high-level block diagram showing an information processing system comprising a computer system 900 useful for implementing the disclosed embodiments. The systems 120, 170, 210, 270, 410, and/or 470 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 300 (FIG. 5), 310 (FIG. 6), and/or process 500 (FIG. 9) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   collecting ambient light sensing (ALS) data indicative of one or more ambient lighting conditions of a user within proximity of a display device;
   collecting user preferences and characteristics (UPC) of the user, wherein the UPC include a user-preferred display correlated color temperature (CCT), and the user-preferred display CCT represents a CCT the user prefers for the display device;
   transmitting to a remote server the ALS data and the UPC;
   receiving from the remote server one or more models constructed based in part on some of the ALS data and some of the UPC;
   predicting one or more user-preferred color temperature settings for the one or more ambient lighting conditions based on the one or more models;
   automatically adjusting one or more color temperature settings of the display device in accordance with the one or more user-preferred color temperature settings;
   constructing a personalized display adaptation model for the user based on user feedback for the adjusting;
   removing sensitive personal data from one or more parameters of the personalized display adaptation model by aggregating the one or more parameters; and
   transmitting the one or more aggregated parameters to the remote server, wherein the one or more models are updated at the remote server based on the one or more aggregated parameters;
   wherein the one or more models include a per-situation model applicable to one or more users in a particular user situation, and the particular user situation comprises age group and type of movie viewed.

2. The method of claim 1, wherein the one or more models are multiple linear regression (MLR) models.

3. The method of claim 1, wherein the one or more models include a universal model applicable to all users, and the personalized display adaptation model is a display color temperature adaptation model.

4. The method of claim 1, further comprising:
   prior to automatically adjusting the one or more color temperature settings of the display device, adjusting a CCT of one or more ambient lighting fixtures within proximity of the display device in accordance with a current CCT of the display device.

5. The method of claim 1, wherein automatically adjusting one or more color temperature settings of the display device comprises:
   predicting a new user-preferred display CCT based on the one or more models and current ALS data indicative of one or more current ambient lighting conditions of the user; and
   adjusting a CCT of the display device in accordance with the new user-preferred display CCT.

6. The method of claim 5, further comprising:
   collecting the user feedback from the user, wherein the user feedback is indicative of satisfaction of the user with the new user-preferred display CCT.

7. The method of claim 1, wherein the UPC further includes a user-preferred display brightness, and the user-preferred display brightness represents a level of brightness the user prefers for the display device.

8. The method of claim 7, further comprising:
   predicting one or more user-preferred brightness settings for the one or more ambient lighting conditions based on the one or more models; and
   automatically adjusting one or more brightness settings of the display device in accordance with the one or more user-preferred brightness settings.

9. A system comprising:
   at least one processor; and
   a non-transitory processor-readable memory device storing instructions that when executed by the at least one processor causes the at least one processor to perform operations including:
   collecting ambient light sensing (ALS) data indicative of one or more ambient lighting conditions of a user within proximity of a display device;
   collecting user preferences and characteristics (UPC) of the user, wherein the UPC include a user-preferred display correlated color temperature (CCT), and the user-preferred display CCT represents a CCT the user prefers for the display device;
   transmitting to a remote server the ALS data and the UPC;
   receiving from the remote server one or more models constructed based in part on some of the ALS data and some of the UPC;
   predicting one or more user-preferred color temperature settings for the one or more ambient lighting conditions based on the one or more models;
   automatically adjusting one or more color temperature settings of the display device in accordance with the one or more user-preferred color temperature settings;
   constructing a personalized display adaptation model for the user based on user feedback for the adjusting;

removing sensitive personal data from one or more parameters of the personalized display adaptation model by aggregating the one or more parameters; and transmitting the one or more aggregated parameters to the remote server, wherein the one or more models are updated at the remote server based on the one or more aggregated parameters;

wherein the one or more models include a per-situation model applicable to one or more users in a particular user situation, and the particular user situation comprises age group and type of movie viewed.

10. The system of claim 9, wherein the one or more models are multiple linear regression (MLR) models.

11. The system of claim 9, wherein the one or more models include a universal model applicable to all users, and the personalized display adaptation model is a display color temperature adaptation model.

12. The system of claim 9, wherein:

the operations further comprise:

prior to automatically adjusting the one or more color temperature settings of the display device, adjusting a CCT of one or more ambient lighting fixtures within proximity of the display device in accordance with a current CCT of the display device.

13. The system of claim 9, wherein automatically adjusting one or more color temperature settings of the display device comprises:

predicting a new user-preferred display CCT based on the one or more models and current ALS data indicative of one or more current ambient lighting conditions of the user; and adjusting a CCT of the display device in accordance with the new user-preferred display CCT.

14. The system of claim 13, wherein the operations further comprise:

collecting the user feedback from the user, wherein the user feedback is indicative of satisfaction of the user with the new user-preferred display CCT.

15. The system of claim 9, wherein the UPC further includes a user-preferred display brightness, and the user-preferred display brightness represents a level of brightness the user prefers for the display device.

16. The system of claim 15, wherein the operations further comprise:

predicting one or more user-preferred brightness settings for the one or more ambient lighting conditions based on the one or more models; and automatically adjusting one or more brightness settings of the display device in accordance with the one or more user-preferred brightness settings.

17. A non-transitory processor-readable medium that includes a program that when executed by a processor performs a method comprising:

collecting ambient light sensing (ALS) data indicative of one or more ambient lighting conditions of a user within proximity of a display device;

collecting user preferences and characteristics (UPC) of the user, wherein the UPC include a user-preferred display correlated color temperature (CCT), and the user-preferred display CCT represents a CCT the user prefers for the display device;

transmitting to a remote server the ALS data and the UPC;

receiving from the remote server one or more models constructed based in part on some of the ALS data and some of the UPC;

predicting one or more user-preferred color temperature settings for the one or more ambient lighting conditions based on the one or more models;

automatically adjusting one or more color temperature settings of the display device in accordance with the one or more user-preferred color temperature settings;

constructing a personalized display adaptation model for the user based on user feedback for the adjusting;

removing sensitive personal data from one or more parameters of the personalized display adaptation model by aggregating the one or more parameters; and transmitting the one or more aggregated parameters to the remote server, wherein the one or more models are updated at the remote server based on the one or more aggregated parameters;

wherein the one or more models include a per-situation model applicable to one or more users in a particular user situation, and the particular user situation comprises age group and type of movie viewed.

18. The non-transitory processor-readable medium of claim 17, wherein the one or more models are multiple linear regression (MLR) models, the personalized display adaptation model is a display color temperature adaptation model, the one or more models include a per-situation model applicable to one or more users in a particular user situation.

* * * * *